United States Patent
Wang et al.

(10) Patent No.: US 6,252,025 B1
(45) Date of Patent: Jun. 26, 2001

(54) VINYL HYPERBRANCHED POLYMER WITH PHOTOGRAPHICALLY USEFUL END GROUPS

(75) Inventors: Jin-Shan Wang; Yanong Wang, both of Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/132,045

(22) Filed: Aug. 11, 1998

(51) Int. Cl.$^7$ .................................................. C08G 61/12
(52) U.S. Cl. ..................... 526/292.9; 526/293; 526/309; 526/313; 526/320; 526/332; 528/98; 430/470
(58) Field of Search .................... 526/233, 26, 292.9, 526/293, 309, 313, 320, 259, 332; 528/98; 106/23

(56) References Cited

U.S. PATENT DOCUMENTS

| | | | |
|---|---|---|---|
| 4,267,306 | 5/1981 | Davis et al. | 528/226 |
| 4,340,664 | 7/1982 | Monbaliu et al. | 430/449 |
| 4,359,570 | 11/1982 | Davis et al. | 528/289 |
| 4,429,099 | * 1/1984 | Kennedy et al. | 528/98 |
| 4,477,635 | 10/1984 | Mitra | 525/437 |
| 4,507,466 | 3/1985 | Tomalia et al. | 528/363 |
| 4,558,120 | 12/1985 | Tomalia et al. | 528/363 |
| 4,617,373 | 10/1986 | Pruett et al. | 528/288 |
| 4,732,570 | 3/1988 | Baumgartner et al. | . |
| 5,085,698 | 2/1992 | Ma et al. | 106/20 |
| 5,098,475 | 3/1992 | Wianik et al. | 106/22 |
| 5,188,641 | 2/1993 | Parton | 8/647 |
| 5,321,162 | * 6/1994 | Kim | 560/317 |
| 5,395,885 | * 3/1995 | Kennedey et al. | 525/98 |
| 5,549,998 | 8/1996 | Georges et al. | 430/109 |
| 5,587,441 | 12/1996 | Frechet et al. | 526/238 |
| 5,587,446 | 12/1996 | Frechet et al. | 526/292.9 |
| 5,635,571 | 6/1997 | Frechet et al. | 525/410 |
| 5,637,637 | 6/1997 | Sharma et al. | 524/502 |
| 5,648,186 | * 7/1997 | Daroux et al. | 429/192 |
| 5,663,260 | 9/1997 | Frechet et al. | 526/292.9 |
| 5,807,937 | 9/1998 | Matyjaszewski et al. | . |
| 5,834,118 | * 11/1998 | Ranby et al. | 428/482 |
| 5,919,861 | * 7/1999 | Kazmmaier et al. | 526/26 |

FOREIGN PATENT DOCUMENTS

| | | |
|---|---|---|
| 703 491 | 3/1996 | (EP) . |
| 877402 | 9/1961 | (GB) . |
| 2 339 202 | 1/2000 | (GB) . |
| 96/30421 | 3/1996 | (WO) . |

OTHER PUBLICATIONS

Gaynor et al: *Architectural Control in Acrylic Polymers by Atom Transfer Radical Polymerization* Polym. Prep. (ACS, Polym. Chem. Div.). 38 (1), 496–497 (1997).

Simon et al: *Hyperbranched Methacrylates by Self-Condensing Group Transfer Polymerization* Polym. Prep. (ACS, Polym. Chem. Div.). 38(1), 498–499 (1997).

Kim et al: *Water–Soluble Hyperbranched Polyphenylene: "A Unimolecular Micelle"?*, J. Am. Chem. Soc. 112, 4592–4593 (1990).

Hawker et al: *One–Step Synthesis of Hyperbranched Dendritic Polyesters*, J. Am. Chem. Soc., 113, 4583–4588 (1991).

Frechet et al: *Self–Condensing Vinyl Polymerization: An Approach to dendritic Materials*, Science, vol. 269, 1080–1083 (1995).

Gaynor et al: *Synthesis of Branched and Hyperbranched Polystyrenes*, Macromolecules, American Chemical Society, vol. 29, 1079–1081 (1996).

Newkome et al: *Cascade Molecules: A New Approach to Micelles, A [27]–Arborol*, J. Org. Chem. 50, 2003–2004 (1985).

Hawker et al: *Control of Surface Functionality in the Synthesis of Dendritic Macromolecules Using the Convergent–Growth Approach*, Macromolecules, vol 23, 4726–4729 (1990).

Jansen et al: *Encapsulation of Guest Molecules Into a Dendritic Box*, Science, vol. 266, 1226–1229 (1994).

Wang et al: *Controlled/"Living" Radical Polymerization. Atom Transfer Radical Polymerization in the Presence of Transition–Metal Complexes*, J. Am. Chem. Soc., 117, 5614–5615 (1995).

Frechet et al, *Living Free Radical Polymerization and Dendritic Polymers*, Polym. Prep. (ACS, Polym. Chem. Div.). 38(1), 756–757.

Chapman et al: *Hydraamphiphilies: Novel Linear Dendritic Block Copolymer Surfactants*, J. Am. Chem. Soc., 116, 11195–11196 (1994).

(List continued on next page.)

*Primary Examiner*—David W. Wu
*Assistant Examiner*—Tanya Zalukaeva
(74) *Attorney, Agent, or Firm*—Andrew J. Anderson

(57) ABSTRACT

Photographically useful materials are disclosed comprising a hyperbranched polymer segment and multiple pendant photographically useful groups. Such materials may be prepared by forming an active hyperbranched polymer segment with multiple functionalized end group sites, and reacting the active hyperbranched polymer segment with an active compound comprising a photographically useful group to form a hyperbranched polymer ended with photographically useful groups. The hyperbranched segment may comprise any kind of polymer segment with hyperbranched architecture, and the active end groups may comprise any kind of reactive site. The active hyperbranched polymer may comprise any kind of other functional groups which are located in either backbone or the ends. The hyperbranched polymers containing photographically useful groups obtained in accordance with the invention are particularly advantageous in that they enable polymer structures comprising components exhibiting different photographically useful properties, while maintaining relatively low intrinsic viscosities compared to non-hyperbranched polymers containing photographically useful groups of similar chemical compositions. Additionally, the hyperbranched polymers are advantageous with respect to dendrimer type polymers in that a wide variety of hyperbranched polymer compositions may be synthesized in accordance with commercially acceptable processes.

12 Claims, No Drawings

OTHER PUBLICATIONS

Frechet et al: *Dendrimers and Hyperbranched Polymers: Two Families of Three–Dimensional Macromolecules With Similar But Clearly Distinct Properties*, J.M.S.—Pure Appl. Chem., A33(10), pp. 1399–1425 (1996).

van Hest et al: *Polystyrene–Poly(propylene imine) Dendrimers: Synthesis, Characterization, and Association Behavior of a New Class of Amphiphiles*, Chem. Eur. J., 2, 1616–1626 (1996).

* cited by examiner

VINYL HYPERBRANCHED POLYMER WITH PHOTOGRAPHICALLY USEFUL END GROUPS

FIELD OF INVENTION

The invention pertains to hyperbranched polymers ended with photographically useful groups.

BACKGROUND OF INVENTION

Polymers with photographically useful groups can be used in many applications. In comparison with ordinary photographically useful compound, polymers with photographically useful groups offer the advantage of allowing a range of physical properties. Their solubility, absorption, migration, and viscosity are tunable. They do not sublime, are non-abrasive, and generally have low toxicity. Moreover, introduction of some special groups to the polymer may add value to special applications. Examples of specific applications for polymers containing photographically useful groups include photographic materials (including photographic films and papers), photographic processing medium, optical data storage, diagnostic testing, printing, microlithography, bulk coloration of polymer, ink jet, sensor, and the like.

The photographically useful groups can be obtained by incorporating monomer(s) or reactive compound(s) containing photographically useful group into polymer backbone or side chain through condensation polymerization, radical polymerization, or post modification. Linear and grafting types of polymer containing photographically useful groups with uncontrolled and simple macromolecular structure are known. For example, U.S. Pat. No. 4,340,664 discloses polymer latexes suited for homogeneously incorporating compounds with a photographically useful group into photographic silver halide emulsion materials. The latex incorporates a copolymer comprising a monomer with photographically useful group and an active monomer. U.S. Pat. Nos. 4,267,306, 4,359,570, and 4,617,373 disclose the preparation of colored polyester using copolymerized anthraquinone colorants. U.S. Pat. No. 4,477,635 discloses a process for preparing solvent soluble nonextractable aminotriarylmethane dye containing polyester, polycarbonate, polyurethane, and polyethyleneimine. U.S. Pat. No. 4,732,570 discloses colored thermoplastic resin composition which are provided by reacting a thermoplastic resin and a colorant in the form of an alkyleneoxy-substituted chromophore group. U.S. Pat. No. 5,188,641 discloses a process for preparing colored polymer by copolymerizing azo dye which contains at least one polymerizable unsaturated group. Copolymerization of azo or anthraquinone dyes containing olefinic groups with other vinyl monomers is disclosed in UK Pat. No. 877,402. U.S. Pat. No. 5,637,637 discloses a process of preparing waterborne copolymeric colorant via emulsion polymerization of an alkaline solution of a reactive dye and a vinyl monomer.

U.S. Pat. No. 5,098,475 discloses the preparation of dendrimeric dye or dyes by reacting Dow's STARBURST™ dendrimer with dye and use of such dye or dyes in ink formulations. Compared with linear and grafting polymers, dendritic polymers (or dendrimers) provide some unique advantages (Frechet, et al. Science, 269, 1080, 1995). First, the intrinsic viscosity of dendrimer is lower compared with linear analog with the same molecular weight. Second, the level of interaction between solvent and polymer is decreased and polymer becomes much more compact. Third, if the functional groups are located at the end of dendrimer, the functional group becomes more accessible and occupies much higher surface area. Since regularly branched dendrimers are typically prepared through lengthy multi-step syntheses, however, their availability is limited to a small group of functional monomers and industrial production of dendrimers is therefore limited.

The synthesis of hyperbranched polymers has also been recently disclosed. Hyperbranched polymers made by condensation reactions, e.g., have been suggested (Kim, et al., J. Am. Chem. Soc., 112, 4592 (1990); Hawker, et al. ibid, 113, 4583 (1991)), and synthesis of hyperbranched homopolymer via living chain polymerization process of vinyl monomers is disclosed by Frechet et al (Frechet, et al. Science, 269, 1080 (1995), U.S. Pat. Nos. 5,587,441, and 5,587,446, the disclosures of which are incorporated by reference herein in their entireties). Compared to dendrimer, hyperbranched polymers are less regular, but still may approximate at least some of the desirable properties of dendrimers (Frechet et al. J. Macromol. Sci., Pure Appl. Chem. A33, 1399 (1996)). More importantly, hyperbranched polymers are more conducive to industrial applications, especially those prepared via living chain polymerization processes.

Since their discovery, various vinyl hyperbranched polymers have been prepared by living cationic polymerization (Frechet, U.S. Pat. No. 5,587,441), atom transfer radical polymerization (Wang, et al., WO 9630421 A1), group transfer polymerization (Muller, et al., Polymer Preprint, 38(1), 498 (1997)), and stable radical polymerization (Hawker, et al., J. Am. Chem. Soc. 113, 4583 (1991)). Vinyl hyperbranched polymers with different structures, such as random copolymer (Gaynor, et al, Macromolecules, 29, 1079 (1996)), grafted hyperbranched copolymer (commonly assigned, copending U.S. Ser. No. 09/105,767, ), and block hyperbranched copolymer (commonly assigned, copending U.S. Ser. No. 09/105,765), can be made by the above processes. The resultant vinyl hyperbranched polymers from living chain polymerization comprise a totally different class of materials from the above-mentioned Dow dendrimer and its derivatives in terms of both chemical composition and macromolecular architecture.

None of the prior art discloses hyperbranched polymer ended with photographically useful group. Further, none of the prior art discloses vinyl hyperbranched polymer ended with photographically useful group.

SUMMARY OF THE INVENTION

In accordance with one embodiment of the invention, a photographically useful material is disclosed comprising a hyperbranched polymer segment and multiple pendant photographically useful groups.

In accordance with another embodiment of the invention, a process for the preparation of a photographically useful polymeric material is disclosed comprising forming an active hyperbranched polymer segment with multiple functionalized end group sites; and reacting the active hyperbranched polymer segment with an active compound comprising a photographically useful group to form a hyperbranched polymer ended with photographically useful groups.

In accordance with a further embodiment of the invention, photographic elements are disclosed comprising a support and at least one hydrophilic colloid layer coated thereon containing a polymeric photographically useful material comprising a hyperbranched polymer segment and multiple pendant photographically useful groups.

In accordance with specific embodiments of the invention, an active vinyl hyperbranched polymeric precursor is made through: (a), one-pot synthesis of living or controlled polymerization of branching monomer or monomers or branching monomer or monomers with other monomer or monomers including macromonomers, in which active group originates from branching monomer; (b), end-capping of a living hyperbranched polymer with a deactivator containing certain active group; (c), modification of a pre-formed hyperbranched polymer or copolymer.

In accordance with specific embodiments of the invention, it has been discovered that the reaction between a pre-formed active vinyl hyperbranched polymer and a reactive compound containing photographically useful group yields hyperbranched polymer ended with photographically useful group.

The hyperbranched segment may comprise any kind of polymer segment with hyperbranched architecture, and the active end groups may comprise any kind of reactive site. The active hyperbranched polymer may comprise any kind of other functional groups which are located in either backbone or the ends.

The hyperbranched polymers containing photographically useful groups obtained in accordance with the invention are particularly advantageous in that they enable polymer structures comprising components exhibiting different photographically useful properties, while maintaining relatively low intrinsic viscosities compared to non-hyperbranched polymers containing photographically useful groups of similar chemical compositions. Additionally, the hyperbranched polymers are advantageous with respect to dendrimer type polymers in that a wide variety of hyperbranched polymer compositions may be synthesized in accordance with commercially acceptable processes.

DETAILED DESCRIPTION OF THE INVENTION

Preparation of polymers in accordance with the invention involves two steps. The first step is to produce a multi end-functional active hyperbranched polymer or copolymer by means of known living or controlled polymerization methods. The second one is to use such an active hyperbranched polymer or copolymer to react with an active compound containing photographically useful groups to form vinyl hyperbranched polymer ended with photographically useful group.

Active hyperbranched polymers employed in accordance with the invention comprise a hyperbranched polymer segment with multiple active end groups. The hyperbranched segment may comprise any kind of polymer segment with hyperbranched architecture. Examples of hyperbranched architectures include but not limited to: hyperbranched homopolymer and hyperbranched random copolymer such as disclosed in Frechet et al. U.S. Pat. Nos. 5,587,441 and 5,587,446, hyperbranched block copolymer such as disclosed in commonly assigned, copending U.S. Ser. No. 09/105,765, the disclosure of which is incorporated by reference in its entirety herein, and hyperbranched graft copolymer such as disclosed in commonly assigned, copending U.S. Ser. No. 09/105,767, the disclosure of which is incorporated by reference in its entirety herein. Active groups may comprise any kind of reactive groups.

A wide variety of known polymerization methods can be used to produce the hyperbranched architecture of the hyperbranched polymers. In accordance with preferred embodiments, the hyperbranched segment of the hyperbranched polymer are obtained through a living/controlled polymerization of one or several special monomers, which are referred to as branching monomer, with or without additional non-branching monomers or macromonomers. In the synthesis of hyperbranched polymer via living chain polymerization process of vinyl monomers, an "AB" type monomer is used as described in the above cited Frechet et al. references. The AB vinyl monomer is a polymerizable initiator molecule, which contains a second reactive group B in addition to a reactive vinyl group A, which group B is activated by an external event to produce an activated polymerizable initiator molecule AB*. Not all AB molecules need to be activated to AB* during the polymerization process, since both activated groups A* and B* can add to any available A group, and any B group that remains inactivated may become activated later as a consequence of an exchange process. Since AB monomer is fully responsible for a hyperbranching macromolecule, we refer to it as a hyperbranching monomer or branching monomer. Specific details as to hyperbranching AB type monomers are set forth in the above referenced documents, the disclosures of which are incorporated by reference herein in their entireties. Possible polymerization techniques include but not limited to stable radical polymerization, atom transfer radical polymerization, anionic polymerization, cationic polymerization, coordination polymerization, group transfer polymerization, ring opening polymerization, and condensation polymerization. In accordance with preferred embodiments, the hyperbranched segments are obtained through a radical polymerization process, such as stable radical polymerization and atom transfer radical polymerization (ATRP).

As stated above, hyperbranched polymer segments for use in accordance with the invention are preferably obtained by radical polymerization processes. Hyperbranched polystyrene and poly methacrylate derivatives, e.g., may be obtained by stable radical polymerization and group transfer polymerization as discribed in Hawker, et al. J. Am. Chem. Soc. 113, 4583, (1991) and Simon, et al Polym. Prep. (ACS, Polym. Chem. Div.) 38(1) 498 (1997), respectively. Alternatively, using atom transfer radical polymerization (ATRP), Gaynor, et al has synthesized hyperbranched poly (chloromethyl styrene) (PCS) and hyperbranched poly acrylate (Gaynor, et al Polym. Prep. 38 (1), 496 (1997)). ATRP is a recently developed living/controlled radical polymerization process (Wang, et al. J. Am. Chem. Soc., 117, 5614 (1995)). Hyperbranched random copolymers can also be made by similar processes, using branching monomer(s) and other branching monomer(s) or non-branching monomer(s). Frechet et al. U.S. Pat. No. 5,663,260, e.g., discloses a hyperbranched copolymer comprising branching AB monomer and non-branching C monomer. ATRP of chloromethyl styrene and styrene has yielded a hyperbranched poly (CS-co-styrene) random copolymer (Gaynor, et al Macromolecules, 29, 1079 (1996)). Frechet et al. U.S. Pat. No. 5,635,571 discloses $A_nCB$ type of branching macromonomers with A and B being functional groups and C being a segment with possible pending oligomeric ethylene oxide side chain. The polymerization, i.e., condensation reaction between n numbers of A group and B group, yielded a hyperbranched polymer with pending oligomeric ethylene oxide side chain. Any of such hyperbranched polymer architectures may be used in accordance with the invention.

In accordance with particularly preferred embodiments of the invention, hyperbranched segments are obtained based on an ATRP process such as disclosed in World Patent Application Publication WO 96/30421, the disclosure of which is incorporated by reference herein in its entirety. In such ATRP process, one or more radically polymerizable monomers are polymerized in the presence of an initiator having a radically transferable atom or group, a transition metal compound and a ligand to form a (co)polymer, the transition metal compound having a formula $M_t^{n+}X'_n$, and the ligand being any N—, O—P—, or S— containing compound which can coordinate in a σ-bond or any carbon-containing compound which can coordinate in a π-bond to the transition metal, such that direct (i.e., covalent) bonds between the transition metal and growing polymer radicals are not formed. Such process provides a high degree of control over the polymerization process, and allows for the formation of various polymers and copolymers with more uniform properties.

A wide variety of polymerizable branching monomers which can undergo chain polymerization for use in accordance with the invention are available commercially, or such monomers may be synthesized through conventional reactions. These branching monomers generally comprise a chain polymerizable group, such as a vinyl group, and a separate reactive site which can be activated thermally or in the presence of polymerization catalysts with the formation of initiating species, or branching species. Polymerizable branching monomers may be selected, e.g., from: styrenes; conjugated dienes; acrylates; amine, carboxyl, aldehyde, alkyl, cyano and hydroxyl substituted acrylic acids and acrylic acid esters; acrylamides; methacrylamides; acrylic acids; methacrylic acids; acroleins; dimethaminoethylacrylates; dimethaminoethyl methacrylates; maleic acids; and maleic anhydrides compounds, where such compounds also comprise a substituent providing a separate reactive site. The separate reactive site for the branching monomers may be provided by a substituent comprising a halogen atom (e.g., Cl, Br, or I, preferably Cl or Br) in atom transfer radical polymerization and living cationic polymerization, TEMPO (2,2,6,6-tetramethyl-1-piperidinyloxy, free radical) and its derivatives in stable radical polymerization, and S and Se containing groups in atom transfer radical polymerization and related processes, substituted silicon in group transfer polymerization, metal atoms in living anionic polymerization, and tert-alkyl ammonium in metal-free anionic polymerization. The branching monomer itself may additionally comprise an oligomeric or polymeric unit containing repeating groups (e.g., about 5 to 100 repeating groups), which can be a homopolymer or random copolymer or block copolymer unit or other types of polymeric unit including dendritic and branched polymeric units.

Specific examples of polymerizable branching monomers which may be used in accordance with the invention include but are not limited: m-vinyl benzylchloride, p-vinyl benzylchloride, m/p-vinyl benzylchloride, trichloroethyl acrylate, trichloroethyl methacrylate, α-chloroacrynitrile, α-chloroacrylate, α-chloroacrylic acid, α-bromomaleic anhydride, α-chloromaleic anhydride, 2-(2-chloropropionyloxy)ethyl acrylate, 2-(2-bromopropionyloxy)ethyl acrylate, 2-(2-chloropropionyloxy)ethyl methacrylate, 2-(2-bromopropionyloxy)ethyl methacrylate.

Hyperbranched polymer segments used in accordance with the invention comprise at least 2 active end group sites for reaction with active compounds containing photographically useful groups, preferably from 2 to 500,000 and more preferably from 10 to 1,000 active end group sites. Various organic or organometalic functional groups can be introduced to the ends of hyperbranched polymer or copolymer to form the active end groups of the hyperbranched polymer. By definition, a functional group is a moiety attached to a molecule that performs a function in terms of the reactivity and/or the physical properties of the molecule bearing it. Example of active groups include but not limited to: halogens (e.g., Cl, Br, I), hydroxyl (—OH) groups such as —CH$_2$OH, —C(CH$_3$)$_2$OH, —CH(OH)CH$_3$, phenol and the like, thiol (—SH) groups, aldehyde (—CHO) and ketone (>C=O) groups, amine (—NH$_2$) groups, carboxylic acid and salt (—COOM, where M is H or a counter ion, such as alkali metal or ammonium), sulfonic acid and salt (—SO$_3$M), amide (—CONH$_2$), substituted amine (—NR$_2$, where R is H or a substituent such as $C_{1-18}$ alkyl), —C≡CR', —CH=CHR' (where R' is H or a substituent such as alkyl, aryl, alkaryl or aralkyl or combinations thereof), —COX (where X is halogen), —CH$_2$N(SiR'$_3$)$_2$, —Si(OR')$_3$, —CN, —CH$_2$NHCHO, —B(OR)$_2$, SO$_2$Cl, N$_3$, —MgX.

The multiple active end groups of the reactive hyperbranched polymer and copolymer used in accordance with the invention may be obtained, e.g., by one-pot synthesis using functional monomer. For example, atom transfer radical polymerization of vinyl benzylchloride provides a hyperbranched polymer or copolymer with multi-chlorine end functional groups. Alternatively, active end groups may be obtained by transformation of living or preformed hyperbranched polymer to a desirable functional group by known organic reactions. For example, chlorine-ended hyperbranched poly(vinyl benzylchloride) can be converted to different types of end-functional groups as exemplified in Scheme 1. For simplicity, only one end vinyl benzylchloride monomer unit is illustrated, but it will be readily apparent that hyperbranched polymer segments used in accordance with the invention will comprise numerous such units in accordance with typical hyperbranched polymer architectures as described above.

Scheme 1

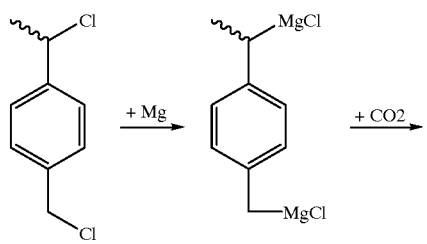

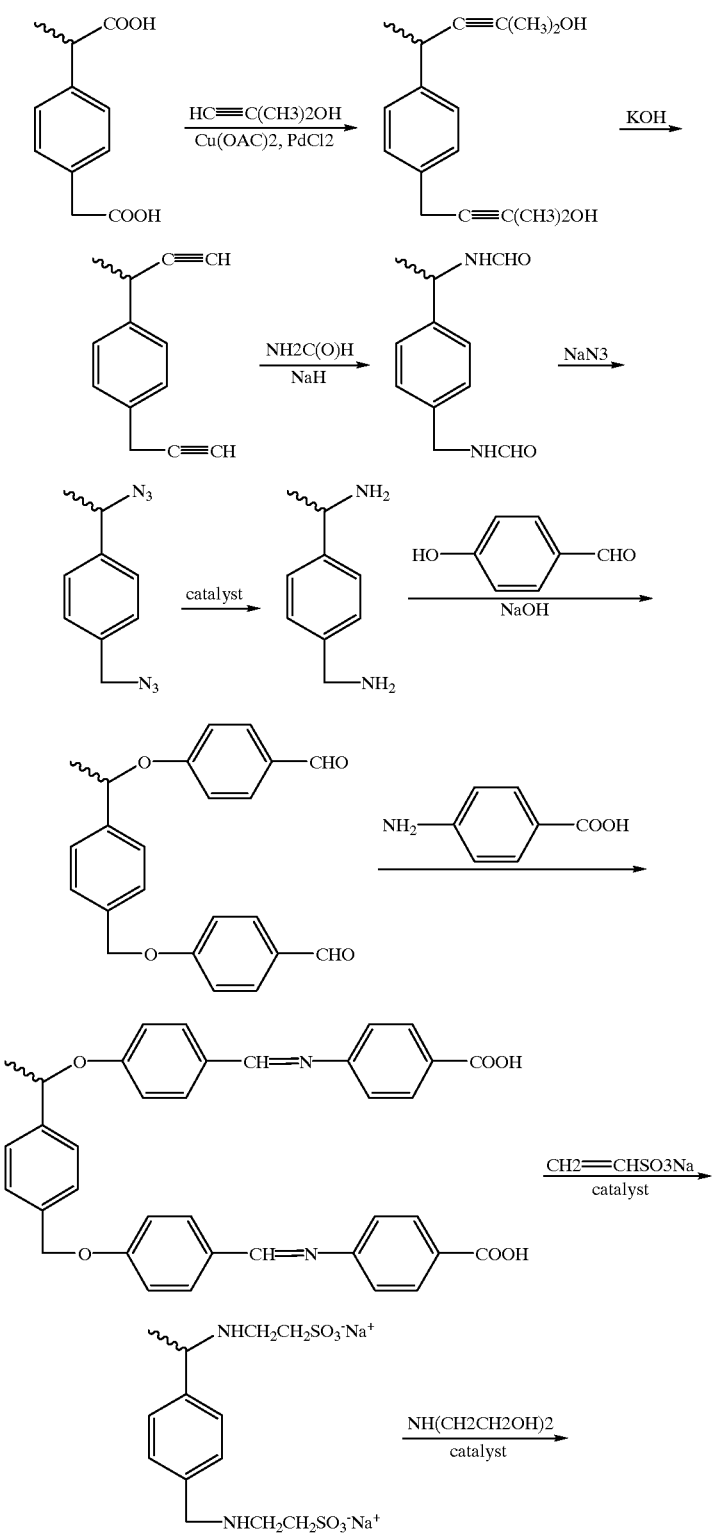

-continued

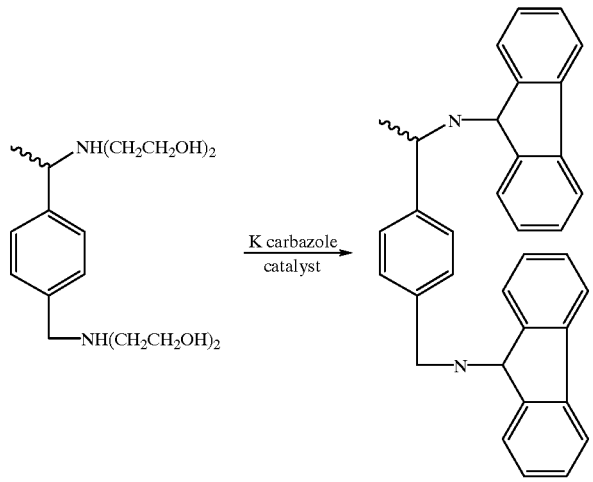

Other special groups such as anti-oxidation, adhesion, dispersion, wetting, surface modification, water soluble, and the like can be introduced to hyperbranched polymer by 1), using branching monomer containing the special group, 2), using comonomer containing the special group to copolymerize with branching monomer or monomers, 3), using post-modification method to introduce the special group into hyperbranched polymer. For example, water soluble grafted hyperbranched segments may be obtained based on an atom transfer radical copolymerization process such as disclosed in commonly assigned copending U.S. Ser. No. 09/105,767 incorporated by reference above. In such ATRP process, water soluble polymer such as poly(ethylene oxide methacrylate) macromonomer was copolymerized with branching monomer such as vinyl benzylchloride to form a water soluble or dispersible grafted hyperbranched copolymer.

The active hyperbranched polymer and copolymer used in the present invention could be in various forms, e.g., solid powder, solution, suspension, bead, latex, and the like. The active hyperbranched polymer and copolymer can be used with or without isolation and purification prior to reaction with a compound containing a photographically useful group.

Any compounds that comprise (a) a photographically useful group or groups and (b) reactive site or sites which can react with the above-described reactive hyperbranched polymer or copolymer can be used in the present invention. The photographically useful group means a group that plays a chemical role in the preparation, storage and/or processing of chemical or digital photographic materials, or defines therefore at least partly the spectral absorption characteristics of such materials. Examples of these photographically useful groups include but are not limited to photographic couplers (including yellow, magenta and cyan image-forming couplers, colored or masking couplers, inhibitor-releasing couplers, and bleach accelerator-releasing couplers, dye-releasing couplers, etc.), preformed dyes (including filter dyes), UV absorbers, reducing agents (including oxidized developer scavengers and nucleators), stabilizers (including image stabilizers, stain-control agents, and developer scavengers), developing agents, development accelerator such as benzyl-a-picolinium bromide, fog-inhibiting compounds such as 1-phenyl-5-mercaptotetrazole, development inhibitor releasing compounds, bleaching-inhibitor-releasing compounds, bleaching-activator-releasing compounds, development boosters, development inhibitors and development moderators, optical brighteners, etc. In accordance with preferred embodiments of the invention the photographically useful groups attached to the hyperbranched polymers are dyes or photographic couplers.

Examples of dyes which may be used in accordance with the invention generally include any known dyes. These dyes could be but are not limited to mono azo dyes, benzodifuranone dyes, anthraquinone dyes, phthalocyanine dyes, azo annulene dyes, polycyclic aromatic carbonyl dyes, indigoid dyes, styryl dyes, di-/tri-aryl carbonium dyes, quinophthalones, sulfur dyes, nitro/nitroso dyes, stilbene dyes, formazan dyes, polymethine dyes and the like. Specific examples include those dyes listed in U.S. Pat. No. 5,098,475, the disclosure of which is incorporated by reference herein in its entirety.

Examples of couplers generally include any known couplers, which include but are not limited to a color coupler capable of coupling with a color developing agent to form a dye such as a cyan forming phenol or naphthol, a yellow forming acylacetamide, or a mangenta-forming pyrazolone or indazolone, a competing coupler.

Couplers that form cyan dyes upon reaction with oxidized color developing agents are described in such representative patents and publications as: U.S. Pat. Nos. 2,772,162; 2,895,826; 3,002,836; 3,034,892; 2,474,293; 2,423,730; 2,367,531; 3,041,236; 4,883,746 and "Farbkuppler-Eine Literature Ubersicht," published in Agfa Mitteilungen, Band III, pp. 156–175 (1961). Preferably such couplers are phenols and naphthols that form cyan dyes on reaction with oxidized color developing agent.

Couplers that form magenta dyes upon reaction with oxidized color developing agent are described in such representative patents and publications as: U.S. Pat. Nos. 2,600,788; 2,369,489; 2,343,703; 2,311,082; 3,152,896; 3,519,429; 3,062,653; 2,908,573 and "Farbkuppler-Eine Literature Ubersicht," published in Agfa Mitteilungen, Band III, pp. 126–156 (1961). Preferably such couplers are pyrazolones, pyrazolotriazoles, or pyrazolobenzimidazoles that form magenta dyes upon reaction with oxidized color developing agents.

Couplers that form yellow dyes upon reaction with oxidized and color developing agent are described in such representative patents and publications as: U.S. Pat. Nos. 2,875,057; 2,407,210; 3,265,506; 2,298,443; 3,048,194; 3,447,928 and "Farbkuppler-Eine Literature Ubersicht," published in Agfa Mitteilungen, Band III, pp. 112–126 (1961). Such couplers are typically open chain ketomethylene compounds.

The reactive site or sites in the compound which also comprise the above-described photographically useful group or groups can be any functional group or groups. By definition, a functional group is a moiety attached to a molecule that performs a function in terms of the reactivity and/or the physical properties of the molecule bearing it. Example of active groups which may be used for the reactive compound comprising a photographically useful group include but not limited to those described above for the active end groups of the hyperbranched polymers used in accordance with the invention.

The hyperbranched polymer ended with photographically useful group or groups may be obtained by reacting the above-mentioned reactive hyperbranched polymer with above-mentioned reactive compounds comprising photographically useful group(s). A wide variety of known organic reactions can be used to produce such a hyperbranched polymer ended with photographically useful group or groups such as quaternization, condensation, alkylation, etherfication, esterfication, substitution, and the like. Such known reactions can be found in by J. March's Advanced Organic Chemistry: Reactions, Mechanisms, And Structure (Fourth Edition, John Wiley & Son, New York, 1992). For example, the quaternization between chlorine-ended hyperbranched poly(vinyl benzylchloride) and a compound with substituted alkyl amine and photographically useful group (e.g., dye) leads to a cationic hyperbranched polymeric dye, as illustrated in Scheme 2.

Scheme 2

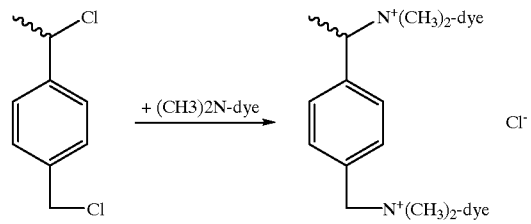

As another example, the reaction between free amine terminated coupler and chlorine ended hyperbranched polymer give rise to a hyperbranched polymeric coupler, as demonstrated in Scheme 3.

Scheme 3

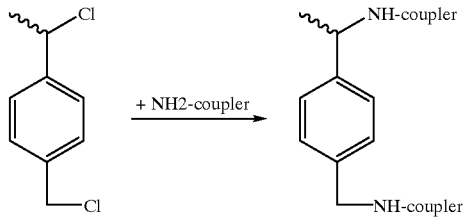

The content of photographically useful groups in the polymer preferably may vary from 0.1 to 50 molar percentages relative to monomeric units in the hyperbranched polymer segment, more preferably from 10 to 50 molar percentages.

The invention is generally applicable to forming hyperbranched polymers containing photographically useful groups which may be used at various locations throughout a photographic element. A photographic element in accordance with the invention will typically comprise a support and at least one hydrophilic colloid layer coated thereon containing a polymeric photographically useful material in accordance with the invention. The hydrophilic colloid layer containing the polymeric photographically useful material may comprise an imaging layer containing a silver halide imaging emulsion, or may be a non-imaging layer of the photographic element.

The invention materials may be used in association with materials that accelerate or otherwise modify the processing steps e.g. of bleaching or fixing to improve the quality of the image. Bleach accelerator releasing couplers such as those described in EP 193,389; EP 301,477; U.S. Pat. Nos. 4,163, 669; 4,865,956; and 4,923,784, may be useful. Also contemplated is use of the compositions in association with nucleating agents, development accelerators or their precursors (UK Patent 2,097,140; U.K. Patent 2,131,188); electron transfer agents (U.S. Pat. Nos. 4,859,578 and 4,912,025); antifogging and anti color-mixing agents such as derivatives of hydroquinones, aminophenols, amines, gallic acid; catechol; ascorbic acid; hydrazides; sulfonamidophenols; and non color-forming couplers.

Suitable hydroquinone color fog inhibitors include, but are not limited to compounds disclosed in EP 69,070; EP 98,241; EP 265,808; Japanese Published Patent Applications 61/233,744; 62/178,250; and 62/178,257. In addition, specifically contemplated are 1,4-benzenedipentanoic acid, 2,5-dihydroxy-delta,delta,delta',delta'-tetramethyl-, dihexyl ester; 1,4-Benzenedipentanoic acid, 2-hydroxy-5-methoxy-delta,delta,delta',delta'-tetramethyl-, dihexyl ester; and 2,5-dimethoxy-delta,delta,delta',delta'-tetramethyl-, dihexyl ester. In addition, it is contemplated that materials of this invention may be used with so called liquid ultraviolet absorbers such as described in U.S. Pat. Nos. 4,992,358; 4,975,360; and 4,587,346.

Various kinds of discoloration inhibitors can be used in conjunction with elements of this invention. Typical examples of organic discoloration inhibitors include hindered phenols represented by hydroquinones, 6-hydroxychromans, 5-hydroxycoumarans, spirochromans, p-alkoxyphenols and bisphenols, gallic acid derivatives, methylenedioxybenzenes, aminophenols, hindered amines, and ether or ester derivatives obtained by silylation, alkylation or acylation of phenolic hydroxy groups of the above compounds. Also, metal complex salts represented by (bis-salicylaldoximato)nickel complex and (bis-N,N-dialkyldithiocarbamato)nickel complex can be employed as a discoloration inhibitor. Specific examples of the organic discoloration inhibitors are described below. For instance, those of hydroquinones are disclosed in U.S. Pat. Nos. 2,360,290; 2,418,613; 2,700,453; 2,701,197; 2,710,801; 2,816,028; 2,728,659; 2,732,300; 2,735,765; 3,982,944 and 4,430,425; and British Patent 1,363,921; and so on; 6-hydroxychromans, 5-hydroxycoumarans, spirochromans are disclosed in U.S. Pat. Nos. 3,432,300; 3,573,050; 3,574, 627; 3,698,909 and 3,764,337; and Japanese Published Patent Application 52-152,225; and so on; spiroindanes are disclosed in U.S. Pat. No. 4,360,589; those of p-alkoxyphenols are disclosed in U.S. Pat. No. 2,735,765; British Patent 2,066,975; Japanese Published Patent Applications 59-010,539 and 57-019,765; and so on; hindered phenols are disclosed, for example, in U.S. Pat. Nos. 3,700, 455; 4,228,235; Japanese Published Patent Applications 52-072,224 and 52-006,623; and so on; gallic acid derivatives, methylenedioxybenzenes and aminophenols are disclosed in U.S. Pat. Nos. 3,457,079; 4,332,886; and Japanese Published Patent Application 56-021,144, respectively; hindered amines are disclosed in U.S. Pat. Nos. 3,336,135; 4,268,593; British Patents 1,326,889; 1,354,313 and 1,410,846; Japanese Published Patent Applications 51-001,420; 58-114,036; 59-053,846; 59-078,344; and so on; those of ether or ester derivatives of phenolic hydroxy groups are disclosed in U.S. Pat. Nos. 4,155,765; 4,174,220; 4,254,216; 4,279,990; Japanese Published Patent Applications 54-145,530; 55-006,321; 58-105,147; 59-010,539; 57-037,856; 53-003,263 and so on; and those of metal complexes are disclosed in U.S. Pat. Nos. 4,050,938 and 4,241,155.

Hyperbranched polymers containing photographically useful groups in accordance with the invention may be incorporated in an imaging element in the form of an aqueous latex or dispersion. The aqueous phase of the dispersions may comprise a hydrophilic colloid, preferably gelatin. This may be gelatin or a modified gelatin such as acetylated gelatin, phthalated gelatin, oxidized gelatin, etc. Gelatin may be base-processed, such as lime-processed gelatin, or may be acid-processed, such as acid processed ossein gelatin. The hydrophilic colloid may be another water-soluble polymer or copolymer including, but not limited to poly(vinyl alcohol), partially hydrolyzed poly(vinylacetate/vinylalcohol), hydroxyethyl cellulose, poly(acrylic acid), poly(1-vinylpyrrolidone), poly(sodium styrene sulfonate), poly(2-acrylamido-2-methane sulfonic acid), polyacrylamide. Copolymers of these polymers with hydrophobic monomers may also be used. The aqueous phase may include surfactants. Surfactants may be cationic, anionic, zwitterionic or non-ionic. Devices suitable for preparing dispersions include but are not limited to blade mixers, devices in which a liquid stream is pumped at high pressure through an orifice or interaction chamber, sonication, Gaulin mills, homogenizers, blenders, etc. More than one type of device may be used to prepare the dispersions.

The photographic elements comprising the hyperbranched polymers of the invention can be single color elements or multicolor elements. Multicolor elements contain image dye-forming units sensitive to each of the three primary regions of the spectrum. Each unit can comprise a single emulsion layer or multiple emulsion layers sensitive to a given region of the spectrum. The layers of the element, including the layers of the image-forming units, can be arranged in various orders as known in the art. In an alternative format, the emulsions sensitive to each of the three primary regions of the spectrum can be disposed as a single segmented layer.

A typical multicolor photographic element comprises a support bearing a cyan dye image-forming unit comprised of at least one red-sensitive silver halide emulsion layer having associated therewith at least one cyan dye-forming coupler, a magenta dye image-forming unit comprising at least one green-sensitive silver halide emulsion layer having associated therewith at least one magenta dye-forming coupler, and a yellow dye image-forming unit comprising at least one blue-sensitive silver halide emulsion layer having associated therewith at least one yellow dye-forming coupler. The element can contain additional layers, such as filter layers, interlayers, overcoat layers, subbing layers, and the like. The location of the polymeric photographically useful material of the invention in an element in accordance with the invention will depend upon the desired function of the photographically useful group(s) which make up the polymeric photographically useful material. For example, polymeric materials comprising dye-forming couplers in accordance with the invention will typically be incorporated in an image-forming emulsion layer, while polymeric materials comprising preformed dyes may be present in an imaging or a non-imaging layer.

If desired, the photographic element can be used in conjunction with an applied magnetic layer as described in *Research Disclosure*, November 1992, Item 34390 published by Kenneth Mason Publications, Ltd., Dudley House, 12 North Street, Emsworth, Hampshire P010 7DQ, ENGLAND.

In the following discussion of suitable materials for use in the emulsions and elements that can be used in conjunction with this photographic element, reference will be made to *Research Disclosure*, September 1994, Item 36544, available as described above, which will be identified hereafter by the term "*Research Disclosure*." The contents of the *Research Disclosure*, including the patents and publications referenced therein, are incorporated herein by reference, and the Sections hereafter referred to are Sections of the *Research Disclosure*, Item 36544.

The silver halide emulsions employed in these photographic elements can be either negative-working or positive-working. Suitable emulsions and their preparation as well as methods of chemical and spectral sensitization are described in Sections I, and III–IV. Vehicles and vehicle related addenda are described in Section II. Dye image formers and modifiers are described in Section X. Various additives such as UV dyes, brighteners, luminescent dyes, antifoggants, stabilizers, light absorbing and scattering materials, coating aids, plasticizers, lubricants, antistats and matting agents are described, for example, in Sections VI–IX. Layers and layer arrangements, color negative and color positive features, scan facilitating features, supports, exposure and processing can be found in Sections XI–XX.

It is also contemplated that the materials and processes described in an article titled "Typical and Preferred Color Paper, Color Negative, and Color Reversal Photographic Elements and Processing," published in *Research Disclosure*, February 1995, Volume 370 may also be advantageously used with materials of the invention.

Various types of hardeners are useful in conjunction with elements of the invention. In particular, bis(vinylsulfonyl) methane, bis(vinylsulfonyl) methyl ether, 1,2-bis(vinylsulfonyl-acetamido) ethane, 2,4-dichloro-6-hydroxy-s-triazine, triacryloyltriazine, and pyridinium, 1-(4-morpholinylcarbonyl)-4-(2-sulfoethyl)-, inner salt are particularly useful. Also useful are so-called fast acting hardeners as disclosed in U.S. Pat. Nos. 4,418,142; 4,618,573; 4,673,632; 4,863,841; 4,877,724; 5,009,990; 5,236,822.

In a color negative element, it is contemplated to use the invention in conjunction with a photographic element comprising a support bearing the following layers from top to bottom:

(1) one or more overcoat layers containing ultraviolet absorber(s);

(2) a two-coat yellow pack with a fast yellow layer containing "Coupler 1": Benzoic acid, 4-chloro-3-((2-(4-ethoxy-2,5-dioxo-3-(phenylmethyl)-1-imidazolidinyl)-3-(4-methoxyphenyl)-1,3-dioxopropyl)amino)-, dodecyl ester and a slow yellow layer containing the same compound together with "Coupler 2": Propanoic acid, 2-[[5-[[4-[2-[[[2,4-bis(1,1-dimethylpropyl)phenoxy]acetyl]amino]-5-[(2,2,3,3, 4,4,4-heptafluoro-1-oxobutyl)amino]-4-hydroxyphenoxy]-2,3-dihydroxy-6-[(propylamino) carbonyl]phenyl]thio]-1,3,4-thiadiazol-2-yl]thio]-, methyl ester and "Coupler 3": 1-((dodecyloxy) carbonyl)ethyl(3-chloro-4-((3-(2-chloro-4-((1-tridecanoylethoxy) carbonyl)anilino)-3-oxo-2-((4)(5)(6)-(phenoxycarbonyl)-1H-benzotriazol-1-yl) propanoyl)amino))benzoate;

(3) an interlayer containing fine metallic silver;

(4) a triple-coat magenta pack with a fast magenta layer containing "Coupler 4": Benzamide, 3-((2-(2,4-bis(1,1-dimethylpropyl)phenoxy)-1-oxobutyl)amino)-N-(4,5-dihydro-5-oxo-1-(2,4,6-trichlorophenyl)-1H-pyrazol-3-yl)-,"Coupler 5": Benzamide, 3-((2-(2,4-bis(1,1-dimethylpropyl)phenoxy)-1-oxobutyl)amino)-N-(4',5'-dihydro-5'-oxo-1'-(2,4,6-trichlorophenyl)(1,4'-bi-1H-pyrazol)-3'-yl)-, "Coupler 6": Carbamic acid, (6-(((3-(dodecyloxy)propyl) amino)carbonyl)-5-hydroxy-1-naphthalenyl)-, 2-methylpropyl ester, "Coupler 7": Acetic acid, ((2-((3-(((3-(dodecyloxy)propyl)amino) carbonyl)-4-hydroxy-8-(((2-methylpropoxy)carbonyl) amino)-1-naphthalenyl)oxy)ethyl)thio)-, and "Coupler 8": Benzamide, 3-((2-(2,4-bis(1,1-dimethylpropyl) phenoxy)-1-oxobutyl)amino)-N-(4,5-dihydro-4-((4-methoxyphenyl)azo)-5-oxo-1-(2,4,6-trichlorophenyl)-1H-pyrazol-3-yl)-; a mid-magenta layer and a slow magenta layer each containing "Coupler 9": a ternary copolymer containing by weight in the ratio 1:1:2 2-Propenoic acid butyl ester, styrene, and N-[1-(2,4,6-trichlorophenyl)-4,5-dihydro-5-oxo-1H-pyrazol-3-yl]-2-methyl-2-propenamide; and "Coupler 10": Tetradecanamide, N-(4-chloro-3-((4-((4-((2,2-dimethyl-1-oxopropyl) amino)phenyl)azo)-4,5-dihydro-5-oxo-1-(2,4,6-trichlorophenyl)-1H-pyrazol-3-yl)amino)phenyl)-, in addition to Couplers 3 and 8;

(5) an interlayer;

(6) a triple-coat cyan pack with a fast cyan layer containing Couplers 6 and 7; a mid-cyan containing Coupler 6 and "Coupler 11": 2,7-Naphthalenedisulfonic acid, 5-(acetylamino)-3-((4-(2-((3-(((3-(2,4-bis(1,1-dimethylpropyl)phenoxy) propyl)amino)carbonyl)-4-hydroxy-1-naphthalenyl)oxy)ethoxy)phenyl)azo)-4-hydroxy-, disodium salt; and a slow cyan layer containing Couplers 2 and 6;

(7) an undercoat layer containing Coupler 8; and (8) an antihalation layer.

Other color negative formats may employ the dispersions of the invention. Of particular interest are layer-thinned color negative film structures in which a smaller amount of gelatin is included in the coated layers.

In a reversal format, it is contemplated to use the invention in conjunction with an element comprising a support bearing the following layers from top to bottom:

(1) one or more overcoat layers;

(2) a nonsensitized silver halide containing layer;

(3) a triple-coat yellow layer pack with a fast yellow layer containing "Coupler 1": Benzoic acid, 4-(1-(((2-chloro-5-((dodecylsulfonyl)amino)phenyl)amino) carbonyl)-3,3-dimethyl-2-oxobutoxy)-, 1-methylethyl ester; a mid yellow layer containing Coupler 1 and "Coupler 2": Benzoic acid, 4-chloro-3-[[2-[4-ethoxy-2,5-dioxo-3-(phenylmethyl)-1-imidazolidinyl]-4,4-dimethyl-1,3-dioxopentyl]amino]-, dodecylester; and a slow yellow layer also containing Coupler 2;

(4) an interlayer;

(5) a layer of fine-grained silver;

(6) an interlayer;

(7) a triple-coated magenta pack with a fast magenta layer containing "Coupler 3": 2-Propenoic acid, butyl ester, polymer with N-[1-(2,5-dichlorophenyl)-4,5-dihydro-5-oxo-1H-pyrazol-3-yl]-2-methyl-2-propenamide; "Coupler 4": Benzamide, 3-((2-(2,4-bis(1,1-dimethylpropyl)phenoxy)-1-oxobutyl)amino)-N-(4,5-dihydro-5-oxo-1-(2,4,6-trichlorophenyl)-1H-pyrazol-3-yl)-; and "Coupler 5": Benzamide, 3-(((2,4-bis(1,1-dimethylpropyl)phenoxy)acetyl)amino)-N-(4,5-dihydro-5-oxo-1-(2,4,6-trichlorophenyl)-1H-pyrazol-3-yl)-; and containing the stabilizer 1,1'-Spirobi(1H-indene), 2,2',3,3'-tetrahydro-3,3,3',3'-tetramethyl-5,5', 6,6'-tetrapropoxy-; and in the slow magenta layer Couplers 4 and 5 with the same stabilizer;

(8) one or more interlayers possibly including fine-grained nonsensitized silver halide;

(9) a triple-coated cyan pack with a fast cyan layer containing "Coupler 6": Tetradecanamide, 2-(2-cyanophenoxy)-N-(4-((2,2,3,3,4,4,4-heptafluoro-1-oxobutyl)amino)-3-hydroxyphenyl)-; a mid cyan containing "Coupler 7": Butanamide, N-(4-((2-(2,4-bis(1,1-dimethylpropyl)phenoxy)-1-oxobutyl)amino)-2-hydroxyphenyl)-2,2,3,3,4,4,4-heptafluoro- and "Coupler 8": Hexanamide, 2-(2,4-bis(1,1-dimethylpropyl)phenoxy)-N-(4-((2,2,3,3,4,4,4-heptafluoro-1-oxobutyl)amino)-3-hydroxyphenyl)-;

(10) one or more interlayers possibly including fine-grained nonsensitized silver halide; and

(11) an antihalation layer.

The invention may also be used in combination with photographic elements containing filter dye layers comprising colloidal silver sol or yellow, cyan, and/or magenta filter dyes, either as oil-in-water dispersions, latex dispersions or as solid particle dispersions. Additionally, they may be used with elements containing "smearing" couplers (e.g. as described in U.S. Pat. No. 4,366,237; EP 96,570; U.S. Pat. Nos. 4,420,556 and 4,543,323.) Also, the compositions may be blocked or coated in protected form as described, for example, in Japanese Application 61/258,249 or U.S. Pat. No. 5,019,492.

The invention materials may further be used in combination with a photographic element containing image-modifying compounds such as "Developer Inhibitor-Releasing" compounds (DIR's). DIR's useful in conjunction with the compositions of the invention are known in the art and examples are described in U.S. Pat. Nos. 3,137,578; 3,148,022; 3,148,062; 3,227,554; 3,384,657; 3,379,529; 3,615,506; 3,617,291; 3,620,746; 3,701,783; 3,733,201; 4,049,455; 4,095,984; 4,126,459; 4,149,886; 4,150,228; 4,211,562; 4,248,962; 4,259,437; 4,362,878; 4,409,323; 4,477,563; 4,782,012; 4,962,018; 4,500,634; 4,579,816; 4,607,004; 4,618,571; 4,678,739; 4,746,600; 4,746,601; 4,791,049; 4,857,447; 4,865,959; 4,880,342; 4,886,736; 4,937,179; 4,946,767; 4,948,716; 4,952,485; 4,956,269; 4,959,299; 4,966,835; 4,985,336 as well as in patent publications GB 1,560,240; GB 2,007,662; GB 2,032,914; GB 2,099,167; DE 2,842,063, DE 2,937,127; DE 3,636,824; DE 3,644,416 as well as the following European Patent Publications: 272,573; 335,319; 336,411; 346, 899; 362, 870; 365,252; 365,346; 373,382; 376,212; 377,463; 378,236; 384,670; 396,486; 401,612; 401,613.

Such compounds are also disclosed in "Developer-Inhibitor-Releasing (DIR) Couplers for Color Photography," C. R. Barr, J. R. Thirtle and P. W. Vittum in *Photographic*

Science and Engineering, Vol. 13, p. 174 (1969), incorporated herein by reference. Generally, the developer inhibitor-releasing (DIR) couplers include a coupler moiety and an inhibitor coupling-off moiety (IN). The inhibitor-releasing couplers may be of the time-delayed type (DIAR couplers) which also include a timing moiety or chemical switch which produces a delayed release of inhibitor. Examples of typical inhibitor moieties are: oxazoles, thiazoles, diazoles, triazoles, oxadiazoles, thiadiazoles, oxathiazoles, thiatriazoles, benzotriazoles, tetrazoles, benzimidazoles, indazoles, isoindazoles, mercaptotetrazoles, selenotetrazoles, mercaptobenzothiazoles, selenobenzothiazoles, mercaptobenzoxazoles, selenobenzoxazoles, mercaptobenzimidazoles, selenobenzimidazoles, benzodiazoles, mercaptooxazoles, mercaptothiadiazoles, mercaptothiazoles, mercaptotriazoles, mercaptooxadiazoles, mercaptodiazoles, mercaptooxathiazoles, telleurotetrazoles or benzisodiazoles.

Although it is typical that the coupler moiety included in the developer inhibitor-releasing coupler forms an image dye corresponding to the layer in which it is located, it may also form a different color as one associated with a different film layer. It may also be useful that the coupler moiety included in the developer inhibitor-releasing coupler forms colorless products and/or products that wash out of the photographic material during processing (so-called "universal" couplers).

As mentioned, the developer inhibitor-releasing coupler may include a timing group which produces the time-delayed release of the inhibitor group such as groups utilizing the cleavage reaction of a hemiacetal (U.S. Pat. No. 4,146,396; Japanese Applications 60-249148; 60-249149); groups using an intramolecular nucleophilic substitution reaction (U.S. Pat. No. 4,248,962); groups utilizing an electron transfer reaction along a conjugated system (U.S. Pat. Nos. 4,409,323; 4,421,845; Japanese Applications 57-188035; 58-98728; 58-209736; 58-209738) groups utilizing ester hydrolysis (German Patent Application (OLS) No. 2,626,315); groups utilizing the cleavage of imino ketals (U.S. Pat. No. 4,546,073); groups that function as a coupler or reducing agent after the coupler reaction (U.S. Pat. Nos. 4,438,193 and 4,618,571) and groups that combine the features describe above. It is typical that the timing group or moiety is of one of the formulas:

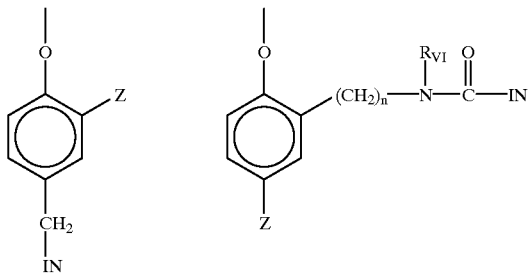

wherein IN is the inhibitor moiety, Z is selected from the group consisting of nitro, cyano, alkylsulfonyl; sulfamoyl ($—SO_2NR_2$); and sulfonamido ($—NRSO_2R$) groups; n is 0 or 1; and $R_{VI}$ is selected from the group consisting of substituted and unsubstituted alkyl and phenyl groups. The oxygen atom of each timing group is bonded to the coupling-off position of the respective coupler moiety of the DIAR.

It is also contemplated that the concepts of the present invention may be employed to obtain reflection color prints as described in Research Disclosure, November 1979, Item 18716, incorporated herein by reference. Materials of the invention may be used in combination with a photographic element coated on pH adjusted support as described in U.S. Pat. No. 4,917,994; with a photographic element coated on support with reduced oxygen permeability (EP 553,339); with epoxy solvents (EP 164,961); with nickel complex stabilizers (U.S. Pat. Nos. 4,346,165; 4,540,653 and 4,906,559 for example); with ballasted chelating agents such as those in U.S. Pat. No. 4,994,359 to reduce sensitivity to polyvalent cations such as calcium; and with stain reducing compounds such as described in U.S. Pat. No. 5,068,171.

Especially useful for use with this invention are tabular grain silver halide emulsions. Specifically contemplated tabular grain emulsions are those in which greater than 50 percent of the total projected area of the emulsion grains are accounted for by tabular grains having a thickness of less than 0.3 micron (0.5 micron for blue sensitive emulsion) and an average tabularity (T) of greater than 25 (preferably greater than 100), where the term "tabularity" is employed in its art recognized usage as $T=ECD/t^2$ where ECD is the average equivalent circular diameter of the tabular grains in microns and t is the average thickness in microns of the tabular grains.

The average useful ECD of photographic emulsions can range up to about 10 microns, although in practice emulsion ECD's seldom exceed about 4 microns. Since both photographic speed and granularity increase with increasing ECD's, it is generally preferred to employ the smallest tabular grain ECD's compatible with achieving aim speed requirements.

Emulsion tabularity increases markedly with reductions in tabular grain thickness. It is generally preferred that aim tabular grain projected areas be satisfied by thin (t<0.2 micron) tabular grains. To achieve the lowest levels of granularity it is preferred that aim tabular grain projected areas be satisfied with ultrathin (t<0.06 micron) tabular grains. Tabular grain thicknesses typically range down to about 0.02 micron. However, still lower tabular grain thicknesses are contemplated. For example, Daubendiek et al U.S. Pat. No. 4,672,027 reports a 3 mole percent iodide tabular grain silver bromoiodide emulsion having a grain thickness of 0.017 micron.

As noted above tabular grains of less than the specified thickness account for at least 50 percent of the total grain projected area of the emulsion. To maximize the advantages of high tabularity it is generally preferred that tabular grains satisfying the stated thickness criterion account for the highest conveniently attainable percentage of the total grain projected area of the emulsion. For example, in preferred emulsions, tabular grains satisfying the stated thickness criteria above account for at least 70 percent of the total grain projected area. In the highest performance tabular grain emulsions, tabular grains satisfying the thickness criteria above account for at least 90 percent of total grain projected area.

Suitable tabular grain emulsions can be selected from among a variety of conventional teachings, such as those of the following: Research Disclosure, Item 22534, January 1983; U.S. Pat. Nos. 4,439,520; 4,414,310; 4,433,048; 4,643,966; 4,647,528; 4,665,012; 4,672,027; 4,678,745; 4,693,964; 4,713,320; 4,722,886; 4,755,456; 4,775,617; 4,797,354; 4,801,522; 4,806,461; 4,835,095; 4,853,322; 4,914,014; 4,962,015; 4,985,350; 5,061,069; and 5,061,616. In addition, use of [100] tabular grain silver chloride emulsions as described in U.S. Pat. No. 5,320,938 are specifically contemplated.

The emulsions can be surface-sensitive emulsions, i.e., emulsions that form latent images primarily on the surfaces of the silver halide grains, or the emulsions can form internal latent images predominantly in the interior of the silver halide grains. The emulsions can be negative-working emulsions, such as surface-sensitive emulsions or unfogged internal latent image-forming emulsions, or direct-positive emulsions of the unfogged, internal latent image-forming type, which are positive-working when development is conducted with uniform light exposure or in the presence of a nucleating agent.

Due to a desire for rapid development, preferred emulsions for color paper are high in silver chloride. Typically, silver halide emulsions with greater than 90 mole % chloride are preferred, and even more preferred are emulsions of greater than 95 mole % chloride. In some instances, silver chloride emulsions containing small amounts of bromide, or iodide, or bromide and iodide are preferred, generally less than 5.0 mole % of bromide less than 2.0 mole % of iodide. Bromide or iodide addition when forming the emulsion may come from a soluble halide source such as potassium iodide or sodium bromide or an organic bromide or iodide or an inorganic insoluble halide such as silver bromide or silver iodide. Soluble bromide is also typically added to the emulsion melt as a keeping addendum.

Color paper elements typically contain less than 0.80 g/m$^2$ of total silver. Due to the need to decrease the environmental impact of color paper processing, it is desired to decrease the amount of total silver used in the element as much as possible. Therefore, total silver levels of less than 0.65 g/m$^2$ are preferable, and levels of 0.55 g/m$^2$ are even more preferable. It is possible to reduce further the total silver used in the color paper photographic element to less than 0.10 g/m$^2$ by use of a so-called development amplication process whereby the incorporated silver is used only to form the latent image, while another oxidant, such as hydrogen peroxide, serves as the primary oxidant to react with the color developer. Such processes are well-known to the art, and are described in, for example, U.S. Pat. Nos. 4,791,048; 4,880,725; and 4,954,425; EP 487,616; International published patent applications Nos. WO 90/013,059; 90/013,061; 91/016,666; 91/017,479; 92/001,972; 92/005,471; 92/007,299; 93/001,524; 93/011,460; and German published patent application OLS 4,211,460.

The emulsions can be spectrally sensitized with any of the dyes known to the photographic art, such as the polymethine dye class, which includes the cyanines, merocyanines, complex cyanines and merocyanines, oxonols, hemioxonols, styryls, merostyryls and streptocyanines. In particular, it would be advantageous to use the low staining sensitizing dyes disclosed in U.S. Pat. Nos. 5,316,904, 5,292,634, 5,354,651, and EP Patent Application 93/203193.3, in conjunction with elements of the invention.

Photographic elements can be exposed to actinic radiation, typically in the visible region of the spectrum, to form a latent image and can then be processed to form a visible dye image. Processing to form a visible dye image includes the step of contacting the element with a color developing agent to reduce developable silver halide and oxidize the color developing agent. Oxidized color developing agent in turn reacts with the coupler to yield a dye.

With negative-working silver halide, the processing step described above provides a negative image. The described elements can be processed in the known C-41 color process as described in The British Journal of Photography Annual of 1988, pages 191–198. Motion picture films may be processed as described in Kodak Publication No. H-24, Manual For Processing Eastman Color Films. Where applicable, the element may be processed in accordance with color print processes, such as the RA-4 process of Eastman Kodak Company as described in the British Journal of Photography Annual of 1988, pages 198–199, the Kodak Ektaprint 2 Process as described in Kodak Publication No. Z-122, using Kodak Ektaprint chemicals, and the Kodak ECP Process as described in Kodak Publication No. H-24, Manual For Processing Eastman Color Films. To provide a positive (or reversal) image, the color development step can be preceded by development with a non-chromogenic developing agent to develop exposed silver halide, but not form dye, and followed by uniformly fogging the element to render unexposed silver halide developable. For elements that lack incorporated dye image formers, sequential reversal color development with developers containing dye image formers such as color couplers is illustrated by the Kodachrome K-14 process (see U.S. Pat. Nos. 2,252,718; 2,950,970; and 3,547,650). For elements that contain incorporated color couplers, the E-6 color reversal process is described in the British Journal of Photography Annual of 1977, pages 194–197. Alternatively, a direct positive emulsion can be employed to obtain a positive image.

In these color photographic systems, the color-forming coupler is incorporated in the light-sensitive photographic emulsion layer so that during development, it is available in the emulsion layer to react with the color developing agent that is oxidized by silver image development. Diffusible couplers are used in color developer solutions. Non-diffusing couplers are incorporated in photographic emulsion layers. When the dye image formed is to be used in situ, couplers are selected which form non-diffusing dyes. For image-transfer color processes, couplers are used which will produce diffusible dyes capable of being mordanted or fixed in the receiving sheet. The invention can also be use in conjunction with color photographic systems which produce black-and-white images from non-diffusing couplers as described by Edwards et al in International Publication No. WO 93/012465.

Photographic color light-sensitive materials often utilize silver halide emulsions where the halide, for example chloride, bromide and iodide, is present as a mixture or combination of at least two halides. The combinations significantly influence the performance characteristics of the silver halide emulsion. As explained in Atwell, U.S. Pat. No. 4,269,927, silver halide with a high chloride content, that is, light-sensitive materials in which the silver halide grains are at least 80 mole percent silver chloride, possesses a number of highly advantageous characteristics. For example, silver chloride possesses less native sensitivity in the visible region of the spectrum than silver bromide, thereby permitting yellow filter layers to be omitted from multicolor photographic light-sensitive materials. However, if desired, the use of yellow filter layers should not be excluded from consideration for a light sensitive material. Furthermore, high chloride silver halides are more soluble than high bromide silver halide, thereby permitting development to be achieved in shorter times. Furthermore, the release of chloride into the developing solution has less restraining action on development compared to bromide and this allows developing solutions to be utilized in a manner that reduces the amount of waste developing solution.

Processing a silver halide color photographic light-sensitive material is basically composed of two steps of 1) color development (for color reversal light-sensitive materials, black-and-white first development is necessary) and 2) desilvering. The desilvering stage comprises a bleaching step to change the developed silver back to an ionic-silver state and a fixing step to remove the ionic silver from the light-sensitive material. The bleaching and fixing steps can be combined into a monobath bleach-fix step that can be used alone or in combination with the bleaching and the fixing step. If necessary, additional processing steps may be added, such as a washing step, a stopping step, a stabilizing step and a pretreatment step to accelerate development. The processing chemicals used may be liquids, pastes, or solids, such as powders, tablets or granules.

In color development, silver halide that has been exposed to light (or a reversal bath for color reversal) is reduced to silver, and at the same time, the oxidized aromatic primary amine color developing agent is consumed by the above mentioned reaction to form image dyes. In this process halide ions from the silver halide grains are dissolved into the developer, where they will accumulate. In addition the color developing agent is consumed by the afore-mentioned reaction of the oxidized color developing agent with the coupler. Furthermore, other components in the color developer will also be consumed and the concentration will gradually be lowered as additional development occurs. In a batch-processing method, the performance of the developer solution will eventually be degraded as a result of the halide ion build-up and the consumption of developer components. Therefore, in a development method that continuously processes a large amount of a silver halide photographic light-sensitive material, for example by automatic-developing processors, in order to avoid a change in the finished photographic characteristics caused by the change in the concentrations of the components, some means is required to keep the concentrations of the components of the color developer within certain ranges.

For instance, a developer solution in a processor tank can be maintained at a 'steady-state concentration' by the use of another solution that is called the replenisher solution. By metering the replenisher solution into the tank at a rate proportional to the amount of the photographic light-sensitive material being developed, components can be maintained at an equilibrium within a concentration range that will give good performance. For the components that are consumed, such as the developing agents and preservatives, the replenisher solution is prepared with the component at a concentration higher than the tank concentration. In some cases a material will leave the emulsions layers that will have an effect of restraining development, and will be present at a lower concentration in the replenisher or not present at all. In other cases a material may be contained in a replenisher in order to remove the influence of a materials that will wash out of the photographic light-sensitive material. In other cases, for example, the buffer, or the concentration of a chelating agent where there may be no consumption, the component in the replenisher is the same or similar concentration as in the processor tank. Typically the replenisher has a higher pH to account for the acid that is released during development and coupling reactions so that the tank pH can be maintained at an optimum value.

Similarly, replenishers are also designed for the secondary bleach, fixer and stabilizer solutions. In addition to additions for components that are consumed, components are added to compensate for the dilution of the tank which occurs when the previous solution is carried into the tank by the photographic light-sensitive material.

The following processing steps may be included in the preferable processing sequences carried out in the method in which a processing solution is applied: 1) color developing→bleach-fixing→washing/stabilizing; 2) color developing→bleaching→fixing→washing/stabilizing; 3) color developing→bleaching→bleach-fixing→ washing/stabilizing; 4) color developing→stopping→washing→bleaching→washing→ fixing→washing/stabilizing; 5) color developing→bleach-fixing→fixing→washing/stabilizing; 6) color developing→bleaching→bleach-fixing→fixing→washing/stabilizing.

Among the processing steps indicated above, the sequences 1), 2), 3), and 4) are preferably applied. Additionally, each of the steps indicated can be used with multistage applications as described in Hahm, U.S. Pat. No. 4,719,173, with co-current, counter-current, and contraco arrangements for replenishment and operation of the multistage processor.

Any photographic processor known to the art can be used to process the photosensitive materials described herein. For instance, large volume processors, and so-called minilab and microlab processors may be used. Particularly advantageous would be the use of Low Volume Thin Tank processors as described in the following references: WO 92/10790; WO 92/17819; WO 93/04404; WO 92/17370; WO 91/19226; WO 91/12567; WO 92/07302; WO 93/00612; WO 92/07301; WO 92/09932; U.S. Pat. No. 5,294,956; EP 559,027; U.S. Pat. No. 5,179,404; EP 559,025; U.S. Pat. No. 5,270,762; EP 559,026; U.S. Pat. Nos. 5,313,243; 5,339,131.

The color developing solution used with this photographic element may contain aromatic primary amine color developing agents, which are well known and widely used in a variety of color photographic processes. Preferred examples are p-phenylenediamine derivatives. They are usually added to the formulation in a salt form, such as the hydrochloride, sulfate, sulfite, p-toluene-sulfonate, as the salt form is more stable and has a higher aqueous solubility than the free amine. Among the salts listed the p-toluenesulfonate is rather useful from the viewpoint of making a color developing agent highly concentrated. Representative examples are given below, but they are not meant to limit what could be used with the present photographic element: 4-amino-3-methyl-N-ethyl-N-(β-hydroxyethyl) aniline sulfate; 4-amino-3-methyl-N-ethyl-N-(β-(methanesulfonamidoethyl)aniline sesquisulfate hydrate; 4-amino-N,N-diethylaniline hydrochloride; 4-amino-3-methyl-N,N-diethylaniline hydrochloride; 4-amino-3-β-(methanesulfonamido)ethyl-N,N-diethylaniline hydrochloride and 4-amino-N-ethyl-N-(2-methoxyethyl)-m-toluidine di-p-toluene sulfonic acid.

Hyperbranched polymer segments used in accordance with the present invention can be made according to processes such as disclosed in U.S. Pat. Nos. 5,587,441 and 5,587,446, Macromolecules, 29, 1079 (1996) (hyperbranched homo- and random co-polymers), and copending, commonly assigned U.S. Ser. Nos. 09/105,767 (hyperbranched grafting copolymers) and 09/105,765 (hyperbranched mult-linear hybrid block copolymer), the disclosures of which are incorporated herein in their entireties. The following are samples of three different hyperbranched polymers made based on atom transfer radical polymerization which were used in the following examples of the present invention.

Sample 1

Multi-chlorine ended hyperbranched poly(p-chlorinemethyl styrene)

Commercial p-chlorinemethyl styrene (50 grams), CuCl (0.715 grams), and 2,2'dipyridyl (1.56 grams), diphenyl ether (50 ml), all from Aldrich, were mixed in a reaction flask. The mixture was purged with dry nitrogen gas for about 15 minutes and then heated at 120 to 130° C. for 19.5 hrs. The resulting solid was first dissolved in THF and then precipitated in cool methanol/water (50/50 v/v) mixture. The polymer was recovered by filtering through a glass filter and dried under vacuum at 60° C. for 18 hrs with 88% yield. Analysis of polymer by GPC gave number average molecular weight (Mn) of 9000, and molecular weight distribution (the ratio of weight average molecular weight to number average molecular weight, Mw/Mn) of 6.4.

Sample 2

Multi-chlorine ended hyperbranched poly(p-chlorinemethyl styrene)-b-multi-methoxyethoxy ethanol hybrid block copolymer 10 grams of multi-chlorine ended p-chlorinemethyl styrene as prepared in sample 1 were mixed with 3 grams of 50% NaOH and 10 grams of methoxyethoxy ethanol in 100 grams of THF in a round bottom flask equipped with water condenser and magnetic stirring bar. The mixture was refluxed for 24 hrs. The remaining salt was filtered out and polymer was precipitated from heptane. 1 NMR of the final polymer indicated 25% molar percent of methoxyethoxy ethanol was attached to the hyperbranched polymer.

Sample 3

Multi-chlorine ended poly(ethylene glycol)-grafted poly(p-chlorinemethyl styrene)

The process is similar to the one in sample 1 except using 50 grams of mixture of commercial p-chlorinemethyl styrene (10 grams, Aldrich), poly((ethylene glycol) monoethylether monomethacrylate) (molecular weight: 400) (PEGE-MA, Polysciences Inc.) (40 grams). NMR analysis of copolymer composition: PEGE: 90%, and CS: 10%. GPC analysis results (in DMF): Mn: 3140 (universal calibration), Mw: 88000 (universal calibration), and viscosity: 0.89 (dL/g).

The following examples illustrate the preparation of polymeric photographically useful materials in accordance with the invention, but are not to be construed as limiting the invention which is defined in the claims appended hereto.

EXAMPLE 1

Hyperbranched polymeric magenta dye 2.0 grams magenta dye DYE-1 was mixed with 1 gram hyperbranched poly (p-vinyl benzylchloride) as prepared in sample 1 in 7.0 grams DMF. The homogeneous mixture was heated at 60° C. for 3 hours. $^1$HNMR analysis indicated that three new broad signals appeared at 3.1 ppm, 3.6 ppm and 4.2 ppm, respectively. UV measurement in DMF indicated a hypthochromic shift from 564 nm (DYE-1) to 548 nm (DYE-1-quaternized hyperbranched polymer).

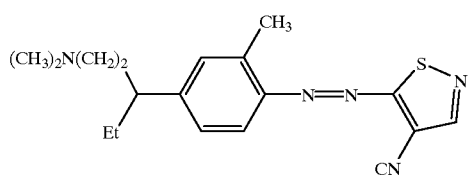

DYE-1

EXAMPLE 2

Water dispersible hyperbranched polymeric magenta dye 2.0 grams magenta dye DYE-1 was mixed with 2 grams multi-chlorine ended hyperbranched poly(p-chlorinemethyl styrene)-b-multi-methoxyethoxy ethanol hybrid block copolymer as prepared in Sample 2 in 7.0 grams DMF. The homogeneous mixture was heated at 60° C. for 3 hours. $^1$HNMR, solubility, and UV measurements indicated the formation of the water dispersible polymeric magenta dye.

EXAMPLE 3

Water soluble hyperbranched polymeric magenta dye 0.95 grams magenta dye DYE-1 was mixed with 1.5 grams hyperbranched poly (p-vinyl benzylchloride) as prepared in Sample 1 in 10 grams DMF. After the homogeneous mixture was heated at 60° C. for 4 hours, 1.0 grams 3-dimethylamino-1-propanol (Aldrich) was added to the above solution. The quaternization continued at 60° C. for another 4 hours. UV measurement in DMF again indicated a hypthochromic shift from 564 nm (DYE-1) to 543 nm (DYE-1-quaternized hyperbranched polymer). The resulting polymeric dye is soluble in methanol and water.

EXAMPLE 4

Water soluble hyperbranched polymeric magenta dye 0.5 grams magenta dye DYE-1 was mixed with 1.0 gram Poly (ethylene glycol) grafted hyperbranched poly (p-vinyl benzylchloride) as prepared in Sample 3 in 10 grams DMF. The quaternization was carried out at 60° C. for 4 hours. UV measurement in DMF again indicated a hypthochromic shift from 564 nm (DYE-1) to 544 nm (DYE-1-quaternized grafted hyperbranched polymer). The resulting polymeric dye is soluble in water.

EXAMPLE 5

Synthesis of hyperbranched polymeric cyan dye 0.07 grams proprietary cyan dye DYE-2 was mixed with 0.26 grams hyperbranched poly(p-vinyl benzylchloride) as prepared in Sample 1 in 3 grams DMF. The homogeneous mixture was heated at 60° C. for 5 hours. UV measurement in DMF again indicated a shift from 667 nm (DYE-2) to 657 nm (DYE-2-quaternized hyperbranched polymer).

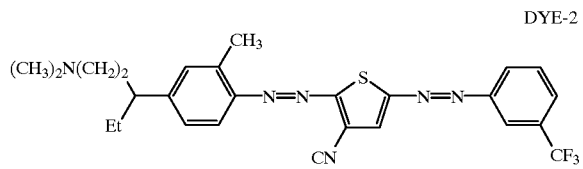

DYE-2

EXAMPLE 6

Synthesis of hyperbranched polymeric yellow dye 2 grams grafted hyperbranched polymer as prepared in Sample 3 was mixed with yellow dye DYE-3 in 10 grams DMF. The homogeneous mixture was heated at 60° C. for 3 hours. UV measurement in DMF indicated a hypthochromic shift from 456 nm (DYE-3) to 446 nm (DYE-3-quaternized hyperbranched polymer).

DYE-3

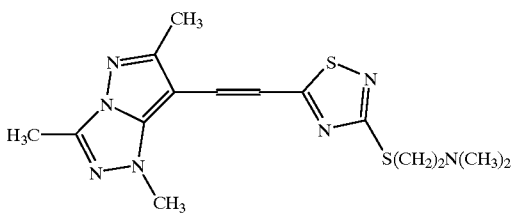

EXAMPLE 7

Hyperbranched polymeric magenta coupler 2.0 grams gram hyperbranched poly(p-vinyl benzylchloride) as prepared in Sample 1 was dissolved in 10 grams toluene as solution I. 3 grams magenta coupler COUP-4 was mixed with 2.1 grams 50% NaOH in 20 grams DMF in a three necks flask equipped with water condenser and magnetic stir bar as solution II. Solution II was placed in a 98° C. oil bath. Solution I was added to solution I via a syringe over 4 hrs. The reaction continued for another 80 minutes. Precipitate was filtered out by a glass filter. Pure polymeric coupler was obtained by extraction of raw material first with methanol and then with deioinzed water. Yield: 45%. The homogeneous mixture was heated at 60° C. for 3 hours. $^1$HNMR analysis indicated that a new broad signal appeared at 5.2 ppm, whereas the signal at 4.5 ppm characteristics of ClCH$_2$ or CHCl active groups in hyperbranched polymer disappeared.

COUP-4

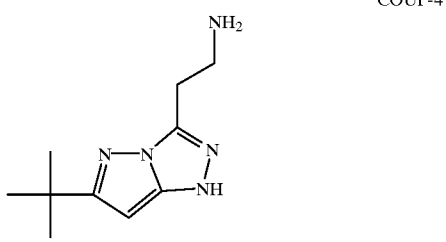

EXAMPLE 8

Hyperbranched polymeric magenta dye 0.1 ml of 10% hyperbranched coupler prepared as in Example 7 in THF was mixed with 0.1 ml of a 20% p-phenylenediamine photographic developer aqueous solution and a few drops of oxidizer aqueous solution at room temperature. Magenta dye was generated slowly. UV measurement in THF showed a signal at around 560 nm. Size exclusive chromatography determination indicated a same elution time for the hyperbranched polymeric dye using both refractive index and UV (at 560 nm) detectors, further indicating the formation of polymeric dye.

The invention has been described in detail with particular reference to certain preferred embodiments thereof, but it will be understood that variations and modifications can be effected within the spirit and scope of the invention. The dyed polymers disclosed in the present invention can be widely used in various applications in addition to silver halide photographic elements, such as but not limited to ink jet, printing, optical storage, and coloration of polymer.

What is claimed is:

1. A photographically useful material comprising a hyperbranched polymer segment and multiple pendant photographically useful groups, formed by reacting hyperbranching monomers to form a hyperbranched polymer segment with multiple functionalized end groups, and reacting the end groups with an active compound containing photographically useful groups.

2. The material of claim 1, wherein the photographically useful groups are selected from photographic couplers, preformed dyes, UV absorbers, reducing agents, stabilizers, developing agents, development accelerators, fog-inhibiting compounds, development inhibitor releasing compounds, bleaching-inhibitor-releasing compounds, bleaching-activator-releasing compounds, development boosters, development inhibitors, development moderators, and optical brighteners.

3. The material of claim 1, wherein the photographically useful group comprises a photographic coupler.

4. The material of claim 1, wherein the photographically useful group comprises a preformed dye.

5. The material according to claim 1, comprising from 2 to 500,000 pendant photographically useful groups.

6. The material according to claim 5, comprising from 10 to 1,000 pendant photographically useful groups.

7. A material according to claim 1, wherein the branching monomer comprises a styrene; conjugated diene; acrylate; amine, carboxyl, aldehyde, alkyl, cyano or hydroxyl substituted acrylic acid or acrylic acid ester; acrylamide; methacrylamide; acrylic acid; methacrylic acid; acrolein; dimethaminoethylacrylate; dimethaminoethyl methacrylate; maleic acid; or maleic anhydride compound which also comprises a substituent providing a separate reactive site.

8. A material according to claim 1, wherein the hyperbranched polymer segment formed by reacting hyperbranching monomer comprising a styrene compound having a substituent providing a separate reactive site comprising a halogen atom.

9. A photographic element comprising a support and at least one hydrophilic colloid layer coated thereon containing a polymeric photographically useful material according to claim 1.

10. An element according to claim 9, wherein the photographically useful group of the photographically useful material comprises a photographic coupler, a preformed dye, a UV absorber, a reducing agent, a stabilizer, a developing agent, a development accelerator, a fog-inhibiting compound, a development inhibitor releasing compound, a bleaching-inhibitor-releasing compound, a bleaching-activator-releasing compound, a development booster, a development inhibitor, a development moderator, or an optical brightener.

11. An element according to claim 9, wherein the photographically useful group of the photographically useful material comprises a photographic coupler.

12. An element according to claim 9, wherein the photographically useful group of the photographically useful material comprises a preformed dye.

* * * * *